United States Patent [19]

Nishimura et al.

[11] Patent Number: 4,709,581
[45] Date of Patent: Dec. 1, 1987

[54] AIR FLOW METER

[75] Inventors: Yutaka Nishimura; Yoshishige Oyama, both of Katsuta, Japan

[73] Assignee: Hitachi, Ltd., Tokyo, Japan

[21] Appl. No.: 769,309

[22] Filed: Aug. 26, 1985

[30] Foreign Application Priority Data

Sep. 7, 1984 [JP] Japan .................. 59-186370

[51] Int. Cl.$^4$ .................. G01F 1/68; G01F 5/00
[52] U.S. Cl. .................. 73/202
[58] Field of Search .................. 73/202, 204

[56] References Cited

U.S. PATENT DOCUMENTS

| | | | |
|---|---|---|---|
| 3,251,225 | 5/1966 | Luft | 73/204 |
| 3,314,290 | 4/1967 | Peranio | 73/202 |
| 3,374,673 | 3/1968 | Trageser | 73/202 |
| 3,559,482 | 2/1971 | Baker et al. | 73/202 |
| 3,769,835 | 11/1973 | Obermaier et al. | 73/202 |
| 4,215,565 | 8/1980 | Zanker | 73/202 |
| 4,393,697 | 7/1983 | Sato et al. | 73/204 |
| 4,457,169 | 7/1984 | Lauterbach et al. | 73/202 |
| 4,476,720 | 10/1984 | Ismail et al. | 73/202 |

FOREIGN PATENT DOCUMENTS 2914275 8/1983 Fed. Rep. of Germany .

OTHER PUBLICATIONS

Sauer, "Hot Wire Air Mass Meter-A New Air Flow Meter for Gasoline Fuel Injection Systems" in SAE Tech. Paper Series, 1980.

Primary Examiner—Herbert Goldstein
Attorney, Agent, or Firm—Antonelli, Terry & Wands

[57] ABSTRACT

An air flow meter including an air flow rate measuring tube located in a main air passageway and having an air inlet portion and an air outlet portion of a bypass passageway formed therein. The air inlet portion is located substantially in a central portion of the cross-sectional surface of the main air passageway, and a hot wire type air flow sensor is mounted in the bypass passageway. The air flow meter is suitable for use with an internal combustion engine of an automotive vehicle.

7 Claims, 33 Drawing Figures

AIR FLOW METER

BACKGROUND OF THE INVENTION

This invention relates to air flow meters of a hot wire type having a bypass passageway, and more particularly to an air flow meter of the hot wire type suitable for use in measuring the flow rate of air drawn by suction into an internal combustion engine of an automotive vehicle.

A hot wire type air flow meter for measuring the flow rate of air drawn by suction into an internal combustion engine of an automotive vehicle is disclosed in SAE Technical Paper Series 800468, for example. This type of air flow meter comprises bare hot wires suspended in a passageway for a flow of air drawn by suction into the internal combustion engine, to obtain measurements of air flow. Although the bare hot wires offer the advantage of being prompt in response, they suffer the disadvantage that they are liable to be damaged because of the backfire in the air passageway.

To obviate this disadvantage, proposals have been made, for example, in Japanese Patent Laid-Open No. 16259/82, corresponding to DE-OS No. 3019544, to use a hot wire type air flow meter comprising a venturi located in a main passageway for a flow of air drawn by suction into the internal combustion chamber, a bypass passageway connected to the main passageway and allowing a portion of the air flowing through the main passageway to be diverted and flow therethrough as a bypass flow by utilizing the pressure differential between a portion of the main passageway upstream of the venturi and a portion of the main passageway in the vicinity of the narrowest portion of the ventury, and a hot wire type air flow sensor located in the bypass passageway to monitor the bypass flow of air so as to determine the flow rate of all the air drawn by suction into the internal combustion chamber based on the flow velocity sensed by the air flow sensor. The use of the hot wire type air flow meter provided with a bypass passageway has raised the problem that, when the air flow to be measured is a pulsating flow, the hot wires are delayed in response and cause the measurements obtained to become smaller than the actual mean air flow rate. To solve this problem, a proposal has been made, in Japanese Patent Laid-Open No. 135916/83 corresponding to U.S. Ser. No. 461,556, to increase the distance between an inlet portion and an outlet portion of the bypass passageway as compared with the distance obtained by measuring the distance in an axial direction along the main passageway, to compensate for the error in measurements. In this hot wire type air flow meter, a flow of air introduced into the air flow meter is split into two air flows at the inlet portion of the bypass passageway or a junction, so that one air flow proceeds through the main passageway and the other air flow through the bypass passageway until the two air flows join at the outlet portion of the bypass passageway or a confluence and flow downwardly out of the air flow meter. The flow velocity of the air flow through the bypass passageway is measured by a hot wire probe and a temperature probe, and the relation between air velocity signals produced by the air flow sensor which senses the air flow velocity through the bypass passageway and the flow rate of all the air flowing through the air flow meter is set beforehand, to allow the flow rate of all the air to be determined based on the flow velocity signals produced by the air flow sensor located in the bypass passageway. In order to ensure that the determination of the flow rate of all the air flowing through the air flow meter is achieved with a high degree of accuracy and precision, the ratio of the air flow through the bypass passageway to the air flow through the main passageway should remain constant at all times, even if the flow rate of all the air flowing through the air flow meter undergoes fluctuations.

However, this hot wire type air flow meter is not without a disadvantage. When the wall of the air flow meter is heated, the flow rate of air flow through the bypass passageway becomes lower than the flow rate of air flow through the main passageway, with the result that the air in the bypass passageway becomes higher in temperature than the air in the main passageway. As a result, the air in the bypass passageway is expanded and the resistance offered by the passageway to the air flow increases, causing the flow rate of air through the bypass passageway to become relatively lower than the flow rate of air through the main passageway. Thus, the hot wire type air flow meter of the aforesaid construction suffers the disadvantage that heating or cooling the wall of the air flow meter causes a drop in the accuracy of the value of an air flow determined by the air flow meter.

In the hot wire type air flow meter of the aforesaid construction, a portion of the air flow through the main passageway which is located near the wall of the main passageway is introduced into the bypass passageway and sensed by the air flow sensor. Generally, a portion of an air flow through an air passageway which is located near the wall of the air passageway tends to become more turbulent than a portion flowing through the center of the air passageway. Thus, signals produced by the hot wire type air flow sensor that monitors the air flow through the bypass passageway which is constituted by the portion of the air flow through the main passageway which is high in turbulence would have a high noise to signal ratio (N/S ratio).

SUMMARY OF THE INVENTION

This invention has been developed for the purpose of avoiding the aforesaid disadvantages of the prior art. Accordingly, the invention has as its object the provision of a hot wire type air flow meter capable of achieving a high degree of accuracy and precision in obtaining measurements of an air flow rate without being influenced by the heat in the air passageway and producing signals of low N/S ratio by an air flow sensor.

To accomplish the aforesaid object, the air flow meter according to the invention comprises an air flow rate measuring tube located in a main air passageway, the air flow rate measuring tube having an air inlet and air outlet and serving as a bypass passageway, and a hot wire type air flow sensor located in the air flow rate measuring tube, the air flow sensor being located substantially in a central portion of the cross-sectional surface of the main air passageway to monitor the air velocity of an air flow through the bypass passageway.

DESCRIPTION OF THE PREFERRED EMBODIMENTS

A first embodiment of the invention will be described by referring to FIGS. 1-6.

Figure 1:
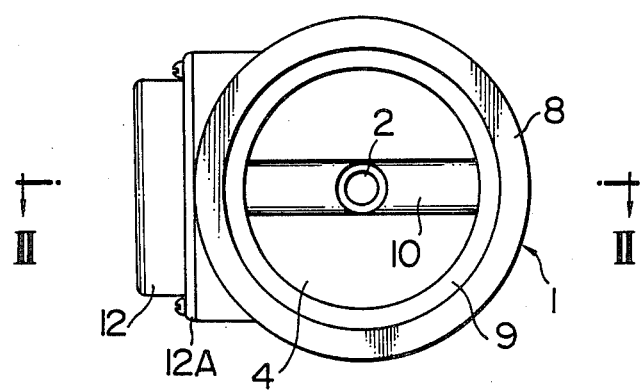
FIG. 1 is a plan view of the air flow meter comprising a first embodiment of the invention.
Figure 2:
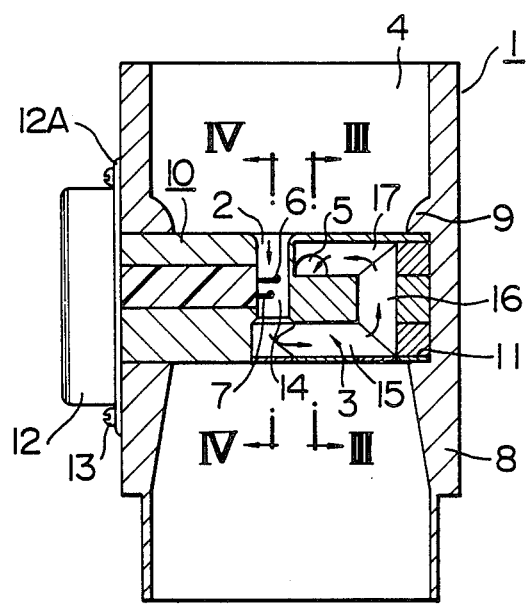
FIG. 2 is a sectional view taken along the line II—II in FIG. 1.
Figure 3:
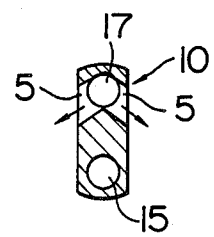
FIG. 3 is a sectional view taken along the line III—III in FIG. 1.
Figure 4:
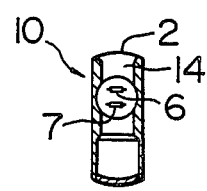
FIG. 4 is a sectional view taken along the line IV—IV in FIG. 2.

Referring to FIGS. 1 and 2, an air flow meter 1 comprises a suction conduit 8 defining a main passageway 4 therein, a venturi 9 formed on an inner periphery of the suction conduit 8, and an air flow rate measuring tube 10 located at the throat of the venturi 9 substantially at right angles to the direction in which air flows in the main passageway 4. The air flow rate measuring tube 10 is fitted at one end thereof located in the suction conduit 8 in a recess 11 formed at one portion of the throat of the venturi 9 and secured at an opposite end thereof to an outer periphery of the suction conduit 8 by screws 13 through a flange 12A of a control section 12 including a control circuit. A junction 2 which serves as an air inlet of a bypass passageway 3 is formed in the flow rate measuring tube 10 in a position located substantially on the center axis of the main passageway 4 or substantially in a central portion of the cross-sectional surface of the main passageway 4 and maintained in communication with a confluence 5 which serves as an air outlet of the bypass passageway formed in the flowrate measuring tube 10. The bypass passageway 3 formed in the air flow rate measuring tube 10 comprises a first or sensor mounting passageway portion 14 contiguous with the junction 2 and extending substantially along the center axis of the main passageway 4, a second passageway portion 15 extending substantially at right angles to the sensor mounting passageway section 14, a third passageway portion 16 extending substantially at right angles to the second passageway portion 15 and a fourth passageway portion 17 extending substantially at right angles to the third passageway portion 16 and contiguous with the confluence 5 which, as shown in FIGS. 2 and 3, is located at one side of the flow rate measuring tube 10. A hot wire probe 6 and a temperature probe 7, both of wound wire type, are mounted in the sensor mounting passageway portion 14, with the hot wire probe 6, temperature probe 7 and control section 12 forming an integral unit enabling a sensor assembly to be inserted into the air flow rate measuring tube 10, which, in turn, is inserted as a unit into the main passageway 4. The bypass passageway 3 of the aforesaid construction has a length which is greater than the length of the main passageway 4 corresponding to the distance between the inlet or junction 2 of the bypass passageway 3 and the outlet or confluence 5 thereof as measured along the center axis of the main passageway 4. FIGS. 3 and 4 show the relative positions of the junction 2, bypass passageway 3 and confluence 5 in sectional views along the lines III—III and IV—IV, respectively, in FIG. 2.

Operation of the first embodiment of the invention of the aforesaid construction will be described. A portion of an air flow introduced into the air flow meter 1 is led through the junction 2 into the bypass passageway 3 as indicated by an arrow and released through the confluence 5 into the main passageway 4 where it joins the air flow therein. The air flow led into the bypass passageway 3 has its flow velocity measured by the hot wire probe 6. Since the ratio of the air flow rate through the bypass passage 3 to the air flow rate through the main passageway 4 is substantially constant, it is possible to obtain the flow rate of air through the main passageway 4 based on a signal produced by the hot wire probe 6 by establishing beforehand the relationship between the air flow rate through the main passageway 4 and the signal produced by the hot wire probe 6.

As shown in FIGS. 1 and 2, the flow rate measuring tube 10 defining the bypass passageway 3 therein is exposed to the air flow through the main passageway 4. Thus, even if the suction conduit 8 is heated or cooled from outside, the wall of the air flow rate measuring tube 10 has a temperature which is kept substantially at the same level as the temperature of the air flowing through the main passageway 4. This makes it possible to keep the ratio of the flow rate of air flowing through the bypass passageway 3 to the flow rate of air flowing through the main passageway 4 substantially constant regardless of whether or not the suction conduit 8 is heated, thereby eliminating the risk that the measurements might have errors.

Figure 5:
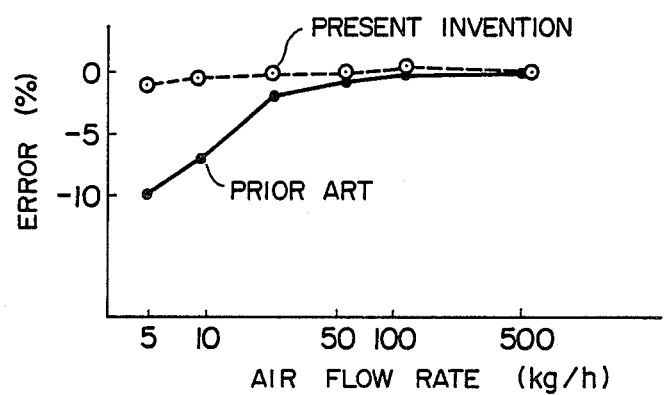
FIG. 5 is a graphical illustration of the relationship between the air flow rate and the error resulting in measuring the air flow rate established when the walls of the air flow meter according to the invention shown in FIGS. 1-4 and an air flow meter of the prior art were heated.

FIG. 5 shows the results of tests conducted on errors in measurements which might result due to variations in air flow rate when air temperature is 20° C. and the temperature of the wall of the suction conduit 8 is 70° C. In an air flow meter of the prior art, the temperature of air flowing through the bypass passageway 3 rises and the air expands, particularly in the low air flow rate range, when the wall of the suction conduit 8 is heated. The expansion of air causes a relative reduction to occur in the flow rate of air through the bypass passageway 3, with the result that the signal produced by the hot wire probe 6 located in the bypass passage 3 has a value which is 5-10% lower than the actual value of the air flow rate. Meanwhile, in the air flow meter 1 according to the invention, the error described hereinabove can be eliminated because the air flow through the bypass passageway 3 shows substantially no rise in temperature.

Figure 6:
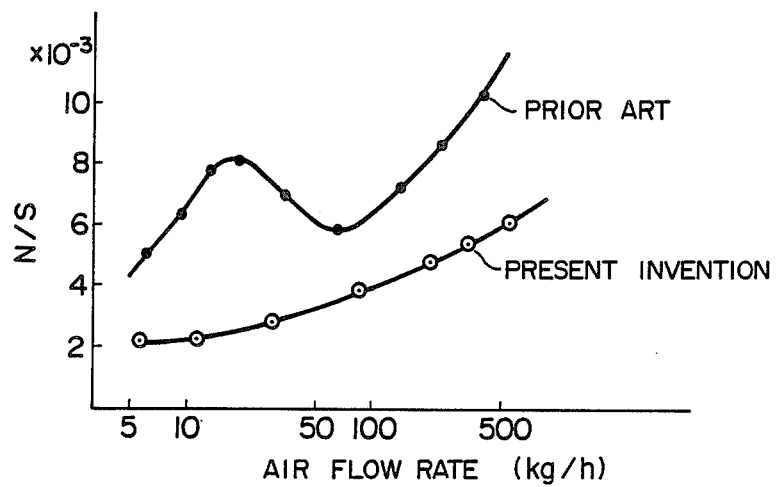
FIG. 6 is a graphical illustration of the relationship between the air flow rate and the noise to signal ratio (N/S ratio) in the air flow meter according to the invention shown in FIGS. 1-4 and an air flow meter of the prior art.

FIG. 6 is a graph showing the results of tests conducted on the relation between the N/X ratio of the signal produced by the hot wire probe 6 and the air flow rate through the bypass passage 3 in the air flow meter according to the invention and an air flow meter of the prior art. In the air flow meter 1 according to the invention, the air flowing into the bypass passageway 3 comes from a central portion of the air flow through the main passageway 4 which is relatively free from turbulence. Meanwhile, in an air flow meter of the prior art, the junction at the main passageway serving as an inlet of the bypass passageway 3 is located at the outer peripheral portion of the main passageway 4. Therefore, the air flowing into the bypass passageway 3 comes from a portion of the air flow through the main passageway 4 located mere the wall thereof which is relatively high in turbulence. The results of tests shown in FIG. 6 indicate that the N/S ratio of the signal produced by the hot wire probe of the air flow meter of the prior art is substantially three times as high as that of the signal produced by the hot wire probe 6 of the air flow meter 1 according to the invention. This is one of the outstanding characteristics of the invention.

The air flow meter 1 according to the invention has a tolerance which is greatly reduced to enable a mass production of the air flow meter to be achieved. More specifically, the suction conduit 8 is formed at one portion of its inner peripheral surface with the venturi 9 which has its throat machined with a high degree of precision, and the flow rate measuring tube 10 has its outer peripheral surface machined with a high degree of precision, and fitted to the throat of the venturi 9. By this structural arrangement, variations in pressure differential between the junction 2 and confluence 5 of the bypass passageway 3 caused by the air flow through the main passageway 4 can be minimized. To reduce variations in the flow rate of air through the bypass passageway 3 which would be caused by this pressure differential, a portion of the bypass passageway 3 has only to be narrowed and machined with a high degree of precision, so that the resistance offered to the flow of air through the bypass passage 3 would be concentrated in this narrowed portion.

Figure 7:
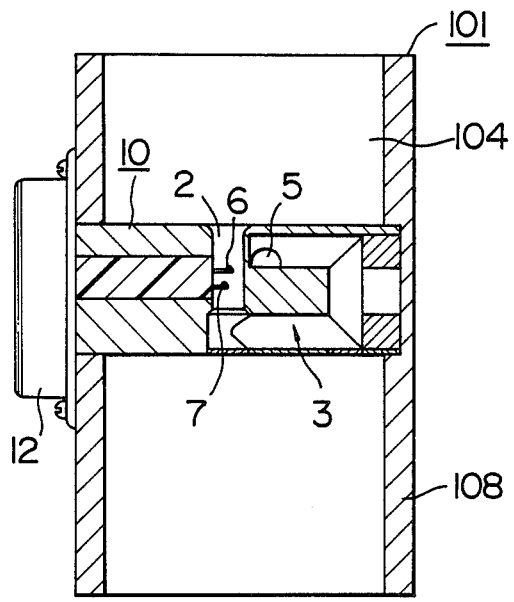
FIG. 7 is a vertical sectional view of the air flow meter comprising a second embodiment of the invention.
Figure 8:
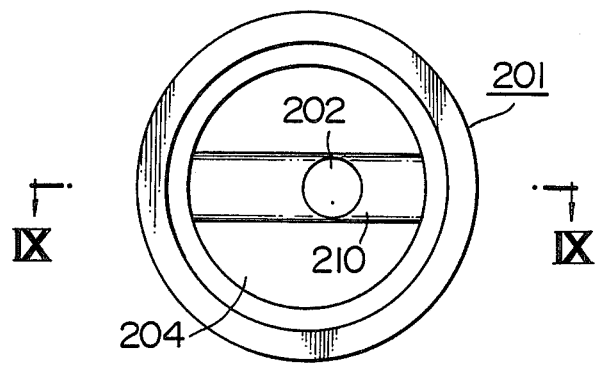
FIG. 8 is a plan view of the air flow meter comprising a third embodiment of the invention.
Figure 9:
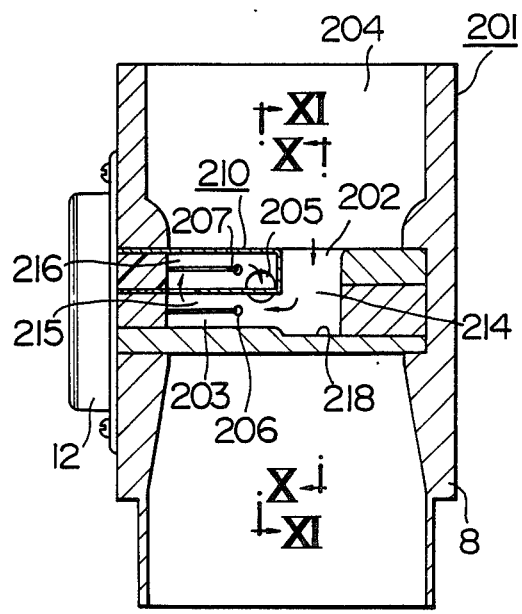
FIG. 9 is a sectional view taken along the line IX—IX in FIG. 8.
Figure 10:
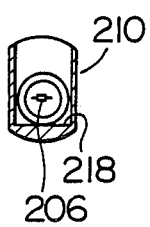
FIG. 10 is a sectional view taken along the line X—X in FIG. 9.
Figure 11:
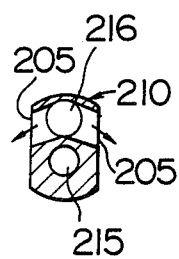
FIG. 11 is a sectional view taken along the line XI—XI in FIG. 9.

Owing to the influence exerted by free convection, the performance of a hot wire air flow sensor is reduced in a low speed range below 0.5 m/s. The resistance offered by the main passageway 4 to the air flow in the air flow meter 1 should be reduced to obtain a high performance of the engine at full-open throttle, making it necessary to increase the cross-sectional area of the main passageway 4. As a result, the air flow velocity at the junction 2 or inlet of the bypass passageway 3 drops and the air flow velocity in the vicinity of the hot wire probe 6 tends to drop. Thus, to reduce variations in the air flow velocity through the bypass passageway 3 and raise the air flow velocity in the vicinity of the hot wire probe 6, the cross-sectional area of the sensor mounting passageway portion 14 of the bypass passageway 3 has only to be reduced to less than 80% of the cross-sectional area of the passageway portions 15, 16 and 17 of the bypass passageway 3. This allows the air flow rate through the bypass passageway 3 to be determined by the resistance offered to the air flow by the sensor mounting passageway portion 14 which can be readily machined with a high degree of precision. In addition, since the sensor mounting passageway portion 14 is narrower than the passageway portions 15, 16 and 17, it is possible to give a highest air flow velocity to the air flowing through the first or sensor mounting passageway portion 14. In the embodiment of FIG. 2 air flow meter 101 comprises a suction conduit 108 of substantially cylindrical configuration, and an air flow rate measuring tube 10 substantially similar in construction to the air flow rate measuring tube shown in FIG. 2 which is inserted in the suction conduit 108. In FIG. 7, the main passageway 104, defined in the suction tube 108, has its transverse cross-sectional area reduced by fitting the air flow rate measuring tube 10 in the suction conduit 108, to thereby accelerate the air flow. Thus, a negative or subatmospheric pressure is produced at the confluence 5 or the outlet of the bypass passageway 3, and the dynamic pressure of an air flow led into the air flow meter 101 acts on the junction 2 or inlet of the bypass passageway 3. As a result, the flow velocity of air flowing in the bypass passageway 3 is substantially at the same level as the flow rate of air flowing through the bypass passageway 3 of the embodiment shown in FIGS. 1 and 2.

In the embodiment of FIGS. 8-11, the invention of this embodiment which air flow meter 201 of this embodiment which has the same suction conduit 8 as shown in FIG. 2 and comprises an air flow rate measuring tube 210 formed therein with a bypass passageway 203 extending from a junction 202 serving as an air inlet through a first passageway portion 214 located substantially lengthwise of the suction conduit 8, a second passageway portion 215 located substantially at right angles to the first passageway portion 214 and a third passageway portion 216 located substantially at right angles to the second passageway portion 215 to a confluence 205 serving as an air outlet whcih opens at one side of the flow rate measuring tube 210. A hot wire probe 206 and a temperature probe 207 are mounted in the second passageway portion 215 and third passageway portion 216, respectively. The first passageway portion 214 is formed with a recess 218 at its bottom, so that an air flow led into the bypass passageway 203 through the junction 202 alters its direction substantially 90 degrees at the end of the first passageway portion 214 and enters the second and third passageway portions 215 and 216 successively where the hot wire and temperature probes 206 and 207 are located, before being released into the main passageway 204 through the confluence 205. In the air flow meter of FIGS. 8-11, the air flow alters its direction upstream of the hot wire probe 206, so that dust in the air flow is separated by inertia and collects in the recess 218 at the bottom of the first passageway portion 214. Since the dust is prevented from impinging on the hot wire probe 206, the dust is prevented from depositing on the hot wire probe 206, thereby reducing a signal drift of the air flow sensor which might otherwise be caused to occur by the dust deposited on the surface of the hot wire probe 206.

Figure 12:
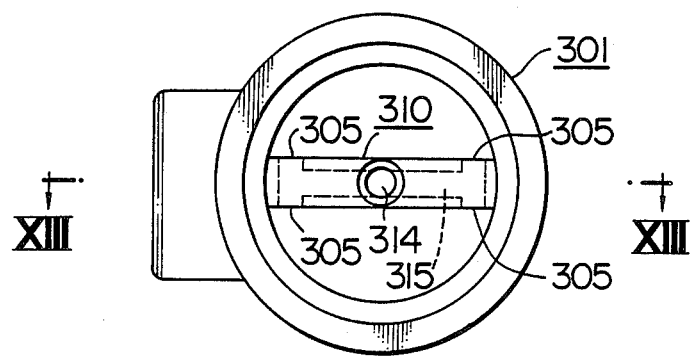
FIG. 12 is a plan view of the air flow meter comprising a fourth embodiment of the invention.
Figure 13:
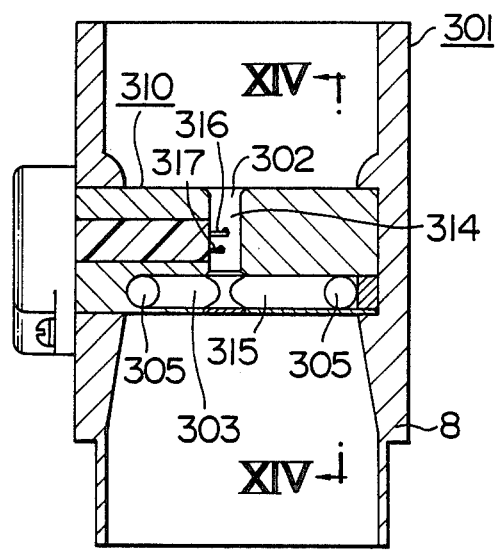
FIG. 13 is a sectional view taken along the line XIII—XIII in FIG. 12.
Figure 14:
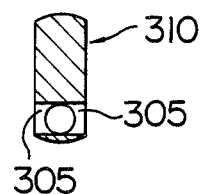
FIG. 14 is a sectional view taken along the line XIV—XIV in FIG. 13.

In FIGS. 12-14, an air flow meter 301 is provided which has the same suction conduit 8 as shown in FIG. 2 comprises an air flow measuring tube 301 formed therein with a bypass passageway 303 extending from a junction 302 serving as an air inlet through a first passageway portion 314 located lengthwise of the suction conduit 8, and a second passageway portion 315 located substantially at right angles to the first passageway portion 314 and lengthwise of the measuring tube 310 to a confluence 305 serving as an air outlet which opens at either end portion of the second passageway portion 315 at either side of the flow rate measuring tube 310. A hot wire probe 316 and a temperature probe 317 are mounted in the first passageway portion 314. In FIGS. 12-14, an air flow led into the bypass passageway 303 at the junction 302 proceeds through the sensor mounting first passageway portion 314 and alters its direction 90 degrees when it enters the second passageway portion 315 where the air flow splits into two branches flowing in opposite directions and released into a main passageway defined by the suction conduit 8 through the confluence 5 having four openings. Thus, the bypass passageway 314 is relatively elongated and can be readily formed in the air flow rate measuring tube 301.

Figure 15:
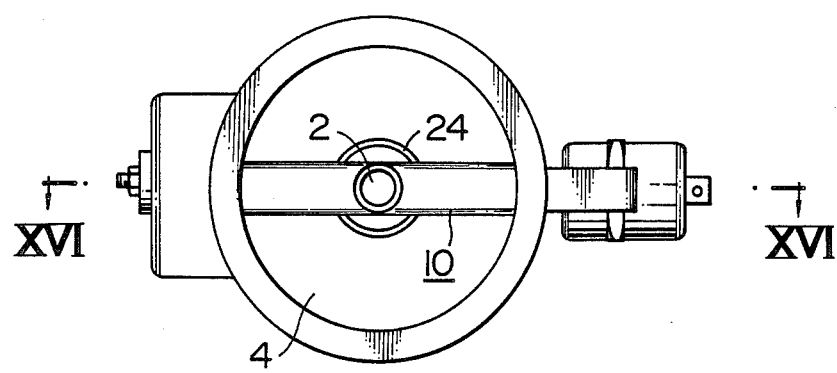
FIG. 15 is a plan view of the air flow meter according to the invention shown in FIGS. 1-4, shown in combination with a fuel injection valve.
Figure 16:
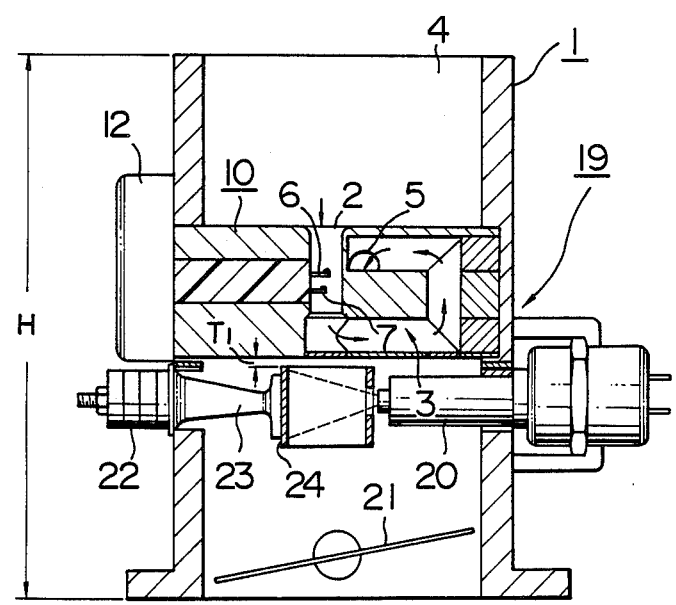
FIG. 16 is a sectional view taken along the line XVI—XVI in FIG. 15.
Figure 17:
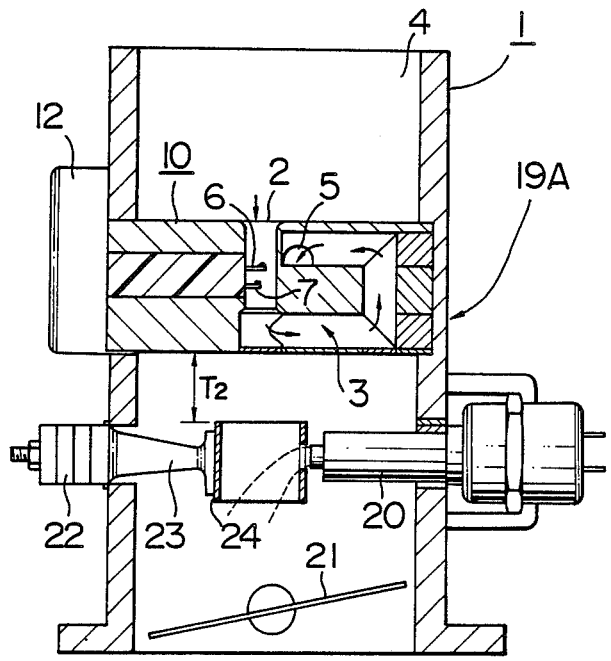
FIG. 17 is a view similar to that of FIG. 16 but showing the ring in a position farther remote from the flow rate measuring tube than in FIG. 16.

FIGS. 15-17 show single-point fuel-injection chambers 19 and 19A wherein the air flow meter 1 according to the invention shown in FIGS. 1 and 2 is combined with a fuel-injection valve 20. The chambers 19 and 29A each have the fuel-injection valve 20 and a throttle valve 21 located downstream of the air flow rate measuring tube 10. To promote atomization of fuel fed through the fuel-injection valve 20, a piezoelectric element 22, a horn 23 and a ring 24 as disclosed in Japanese Patent Laid-Open No. 162972/84, for example, are provided. The single-point fuel-injection chamber 19 shown in FIG. 16 has a restricted height H, so that the fuel-injection valve 20 is directed horizontally. Generally, when a fuel-injection valve is directed horizontally, fuel fed through the fuel-injection valve tends to impinge on an opposing wall surface to be deposited thereon. To avoid this disadvantage, means for atomizing fuel by vibration comprising the piezoelectric element 22 is provided to prevent the fuel fed through the fuel-injection valve 20 from inpinging on a wall surface of the chamber 19. When the clearance between the ring 24 for atomizing the deposited fuel by vibration and the flow rate measuring tube 10 is small as indicated by $T_1$ in FIG. 16, the air flow is blocked by the air flow rate measuring tube 10, so that the fuel fed through the fuel-injection valve 20 impinges on the ring 24 and is atomized by vibration, when the clearance between the ring 24 and air flow rate measuring tube 10 is great as indicated by $T_2$ in FIG. 17, the atomized particles of fuel fed through the fuel-injection valve 20 are forced to flow downwardly by the action of an air flow as indicated by broken lines without impinging on the ring 24. Thus, it is necessary that the clearance T between the ring 24 for atomizing the fuel fed through the fuel-injection valve 20 and the air flow rate measuring tube 10 be small.

Figure 18:
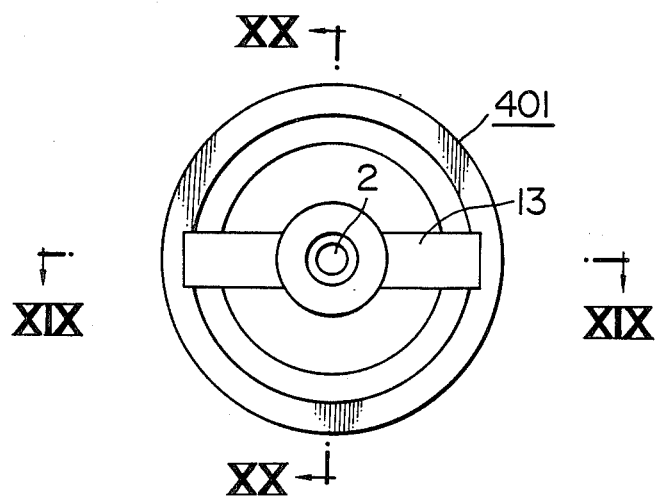
FIG. 18 is a plan view of the air flow meter comprising a fifth embodiment of the invention.
Figure 19:
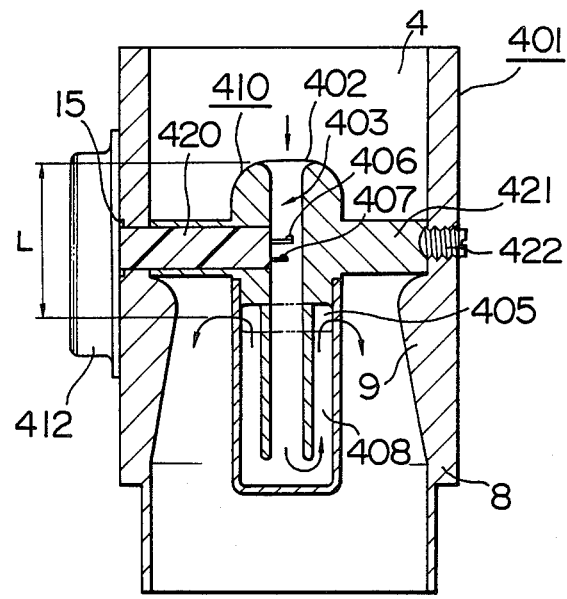
FIG. 19 is a sectional view taken along the line XIX—XIX in FIG. 18.
Figure 20:
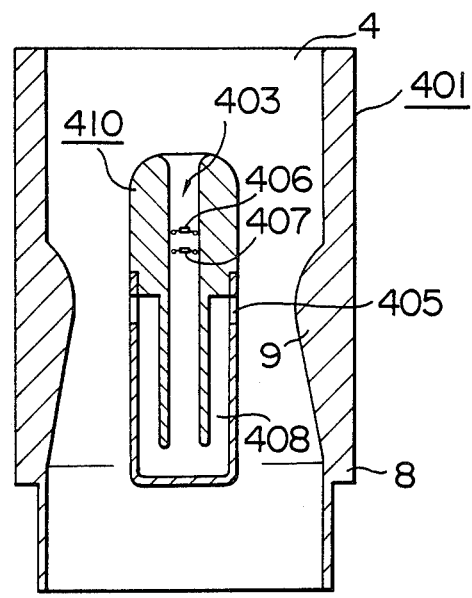
FIG. 20 is a sectional view taken along the line XX—XX in FIG. 18.

FIGS. 18-20 show a fifth embodiment of the invention in which an air flow rate measuring tube 410 is located lengthwise of the main passageway 4 substantially in a central portion of the bore of the suction conduit 8 and formed with a bypass passageway 403 extending axially of the tube 410 substantially in a central portion thereof. A hot wire probe 406 and a temperature probe 407 are mounted in the bypass passageway 403.

The air flow rate measuring tube 410 has a junction 402 serving as an air inlet located subatantially on the center axis of the main passageway 4, and the bypass passageway 403 starting at the junction 402 has connected to its downstream end a roundabout passageway 408 which extends lengthwise of the tube 410 along the bypass passageway 403, so that an air flow led into the bypass passageway 403 from the main passageway 4 through the junction 402 alters its direction 180 degrees at the end of the bypass passageway 403 to flow along the roundabout passageway 408, before being released into the main passageway 4 through a confluence 405 serving as an air outlet formed at either side of the tube 410. A hot wire probe 406 and a temperature probe 407 are mounted in the bypass passageway 403.

The air flow rate measuring tube 410 is secured at one side thereof through a holder 420 to a control section 412 secured to the wall of the suction conduit 8 and has, at an opposite side, a stay 421 threadably connected to the wall of the suction conduit 8 as indicated at 422. Air flowing into the air flow meter 401 from above splits into two air flows at the junction 402 serving as the air inlet of the bypass passageway 403. One air flow proceeds through the main passageway 4 and the other air flow is led into the bypass passageway 403. The air flow led into the bypass passageway 403 is led into the roundabout passageway 408 after passing by the hot wire probe 406 and temperature probe 407, and released through the confluence 405 serving as the air outlet which opens at the throat of the venturi 9 into the main passageway 4, so that the two air flows join at the confluence 405. In this constructional form, the ratio of the length of the bypass passageway 403 to the length of a portion of the main passageway 4 located between the junction 402 and confluence 405 of the air flow rate measuring tube 410 (such length is indicated by L in FIG. 19) can be set at any value as desired by selecting a suitable value for the length of the roundabout passageway 408. Thus, the ratio can be increased three to five times, thereby minimizing errors which might occur due to a delay in the response of the hot wire when the air flow through the bypass passageway 403 is a pulsating flow. The arrangement whereby the air flow rate measuring tube 410 is supported in the air flow in the main passageway 4 by the stay 421 enables the temperature of the air flow rate measuring tube 410 to remain substantially at the same level as the temperature of the air flowing through the main passageway 4 even if the wall of the suction conduit 8 is heated or cooled. Thus, the air flowing through the bypass passageway 403 has the same temperature as the air flowing through the main passageway 4 at all times, thereby eliminating the risk that errors might occur in the measurements made by the hot wire probe 406. The air flow led into the bypass passageway 403 through the junction 402 comes from a central portion of the air flow introduced into the suction conduit 8, so that the air flowing through the bypass passageway 403 is substantially free from turbulence and signals produced by the hot wire probe 406 are low in N/S ratio.

Figure 21:
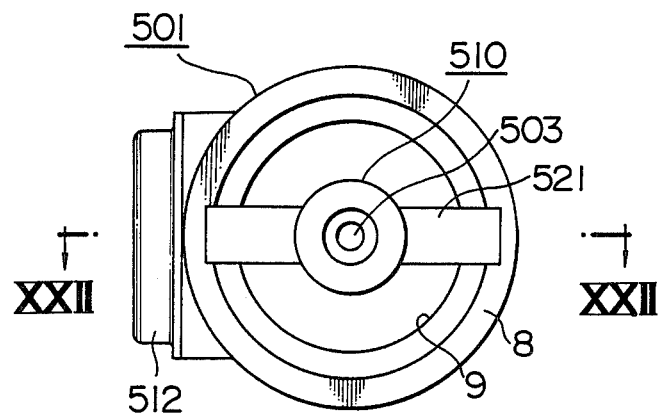
FIG. 21 is a plan view of the air flow meter comprising a sixth embodiment of the invention.
Figure 22:
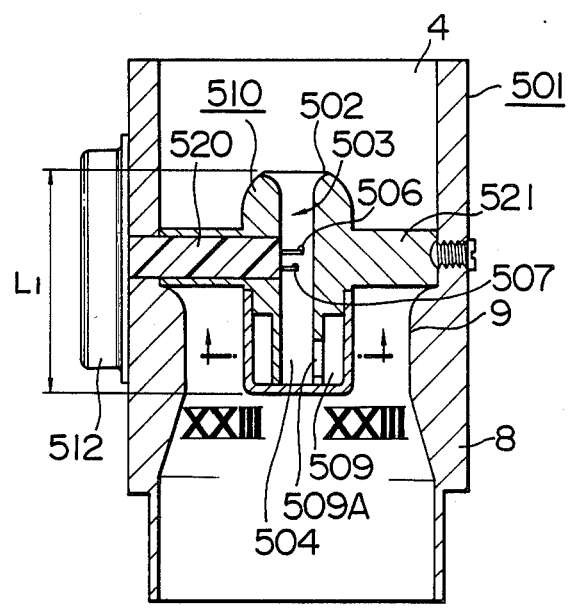
FIG. 22 is a sectional view taken along the line XXII'XXII in FIG. 21.
Figure 23:
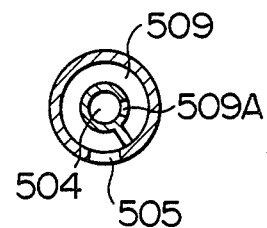
FIG. 23 is a sectional view taken along the line XXIII—XXIII in FIG. 22.

FIGS. 21–23 show a sixth embodiment of the invention, wherein the air flow meter 501 comprises an air flow rate measuring tube 510 supported in the suction conduit 8 by a holder 520 and a stay 521 similar to the corresponding parts shown in FIG. 19. The air flow rate measuring tube 510 is formed therein with a bypass passageway 503 and a roundabout passageway 509 which are constructed such that a passageway portion 504 of the bypass passageway 503 is surrounded by the roundabout passageway 509 substantially through a circumferential extent of 360 degrees. Thus, air led through a junction 502 serving as an air inlet of the bypass passageway 503 flows through the passageway portion 504 extending lengthwise of the air flow rate measuring tube 510 and enters the roundabout passageway 509 through an inlet 509A thereof. The air flows through the roundabout passageway 509 substantially through a circumferential extent of 360 degrees about the bypass passageway 503, before being released into the main passageway 4 through a confluence 505 serving as an air outlet of the bypass passageway 503 which opens in the throat of the venturi 9. By forming the roundabout passageway 509 in annular form, it is possible to reduce the length $L_1$ of the air flow rate measuring tube 510 as compared with the air flow rate measuring tube 410 shown in FIG. 19. Other parts of the embodiment shown in FIG. 22 are similar to the corresponding parts of the embodiment shown in FIG. 2. The reference numerals 506 and 507 designate a hot wire probe and a temperature probe, respectively, and the reference numeral 512 a control section of the air flow rate measuring tube 510.

Figure 24:
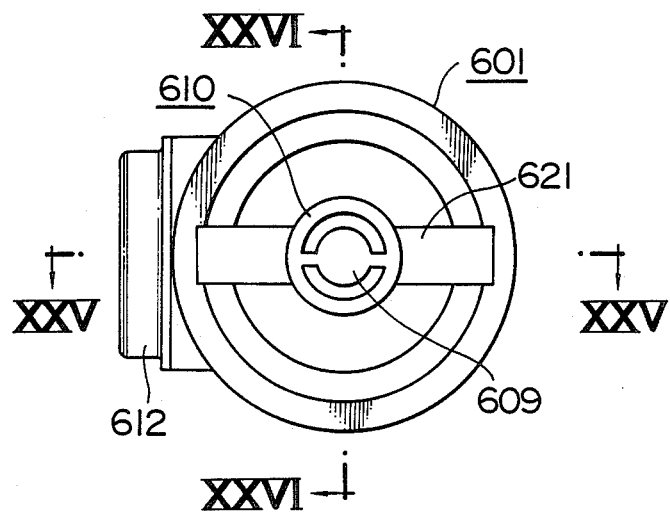
FIG. 24 is a plan view of the air flow meter comprising a seventh embodiment of the invention.
Figure 25:
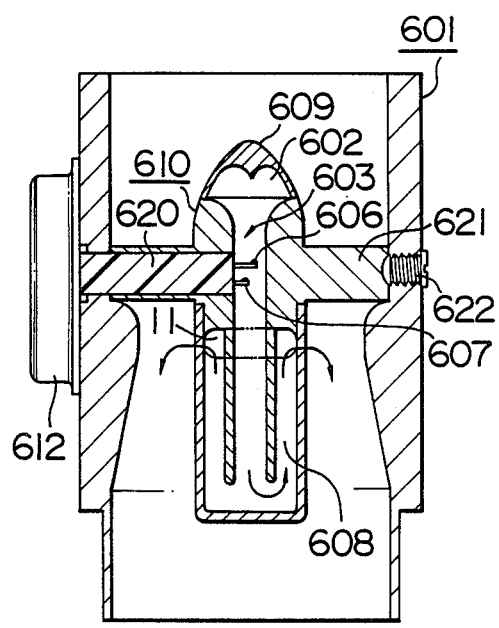
FIG. 25 is a sectional view taken along the line XXV—XXV in FIG. 24.
Figure 26:
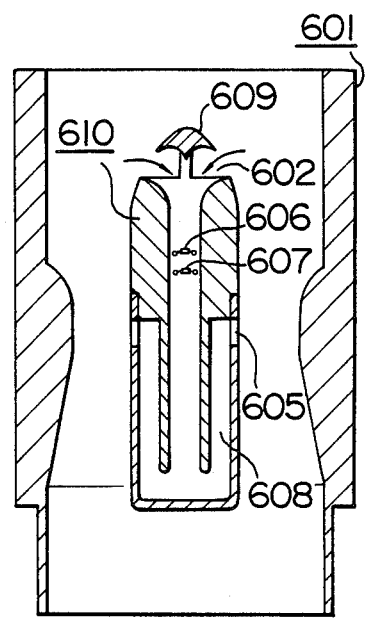
FIG. 26 is a sectional view taken along the line XXVI—XXVI in FIG. 24.

FIGS. 24–26 show a modification of the embodiment shown in FIGS. 18–20 which is provided with a deflector 609 at an inlet of a bypass passageway 603 for deflecting an air flow to avoid deposition of dust on a hot wire probe 606 which might cause a reduction in the accuracy of the air velocity determined by the probe 606.

The air flow meter 601 shown comprises an air flow rate measuring tube 610 which, like the corresponding part of the embodiment shown in FIG. 19, is secured at one side thereof to a control section 612 by a holder 620 and has at an opposite side a stay 621 threadably connected to the wall of the suction conduit 8 as indicated at 622. A bypass passageway 603 formed in the air flow rate measuring tube 610 of the air flow meter 601 of this embodiment which is substantially similar to the corresponding part shown in FIG. 19 except for its inlet portion 602 is contiguous with a roundabout passageway 608 and has a confluence 605 serving as an air outlet. A hot wire probe 606 and a temperature probe 607 are mounted in the bypass passageway 603.

The embodiment of FIGS. 24–26 is characterized by the deflector 609 located at the junction 602 serving as an air inlet of the bypass passageway 603 for deflecting an air flow to avoid deposition of dust on the hot wire probe 606. The provision of the deflector 609 causes air to flow into the bypass passageway 603 from a direction substantially at right angles to the direction of an air flow through the main passageway, so that the major portion of dust in the air introduced into the air flow meter 601 flows by inertia through the main passageway and is prevented from entering the bypass passageway 603. Thus, deposition of dust on the probes 606 and 607 for determining the air flow velocity in the bypass passageway 603 is prevented.

Figure 27:
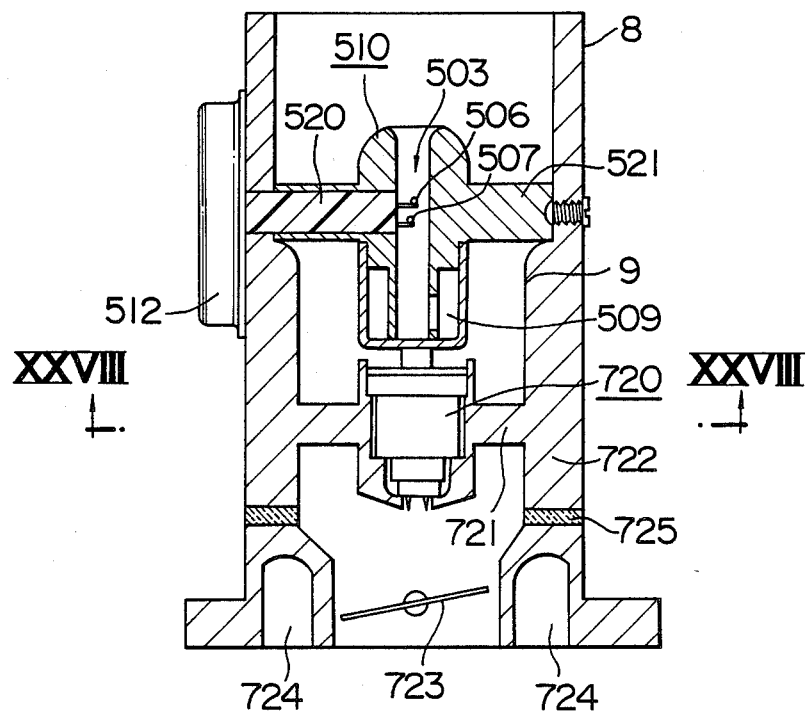
FIG. 27 is a vertical sectional view of the air flow meter comprising an eighth embodiment of the invention.
Figure 28:
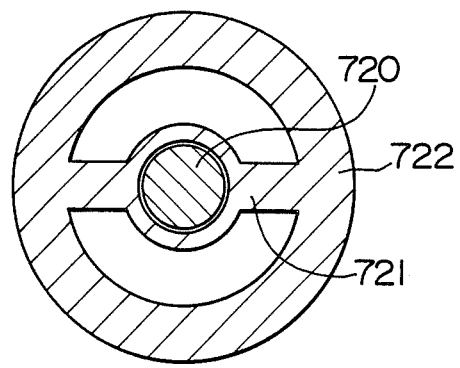
FIG. 28 is a sectional view taken along the line XXVIII—XXVIII in FIG. 27.

FIGS. 27 and 28 show an eighth embodiment of the invention, which comprises the air flow rate measuring tube 510 shown in FIGS. 21–23 and a single-point fuel-injection valve 720 having a microcomputer. Parts shown in FIGS. 27 and 28 which are similar to those shown in FIG. 22 are designated by like reference characters. The fuel-injection valve 720 is supported in the suction conduit 8 by a stay 721 and has an upper portion connected to a lower end of the air flow rate measuring tube 510. The stay 521 for supporting the air flow rate measuring tube 510 and the stay 721 for supporting the fuel-injection valve 510 are parallel to each other and extend in the same direction. The two stays 512 and 712 are secured to a wall portion 722 of the suction conduit 8 defining a throttle chamber. By this structural arrangement, resistance offered to an air flow through the air flow rate measuring tube 510 and fuel-injection valve 720 can be reduced and the height of the throttle chamber can be reduced. In FIGS. 27 and 28, the reference numerals 723, 724 and 725 designate a throttle valve, a warm water heating passageway for vaporizing the fuel released through the fuel-injection valve 720 and a heat-insulating material layer 725, respectively. The heat-insulating material layer 725 performs the function of preventing the fuel-injection valve 720 and throttle chamber wall 722 from being heated by the warm water.

Figure 29:
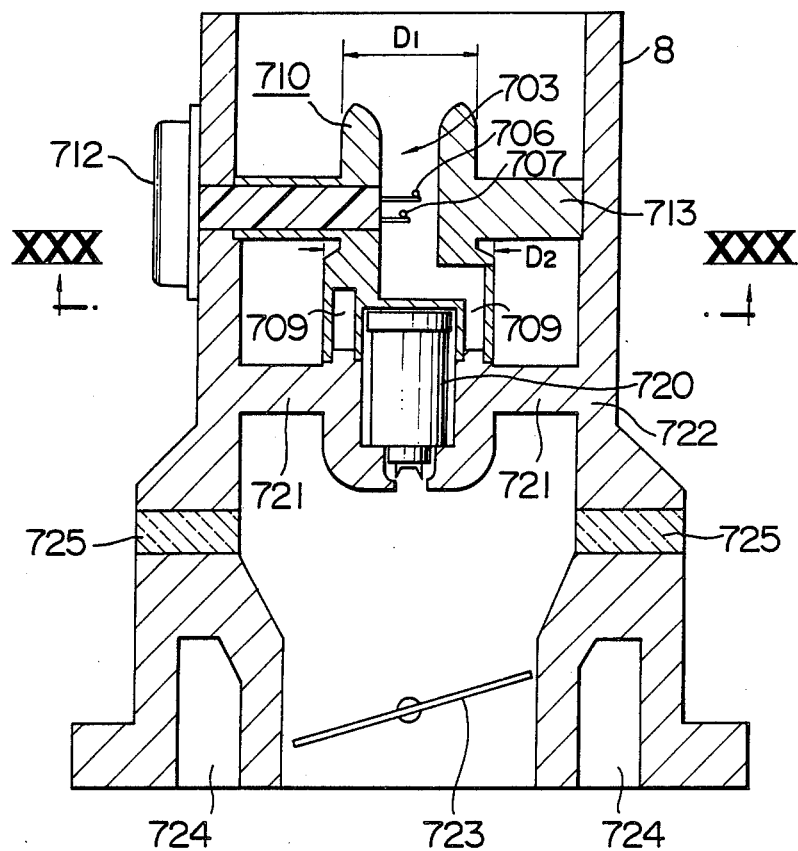
FIG. 29 is a vertical sectional view of the air flow meter comprising a modification of the embodiment shown in FIGS. 27 and 28.
Figure 30:
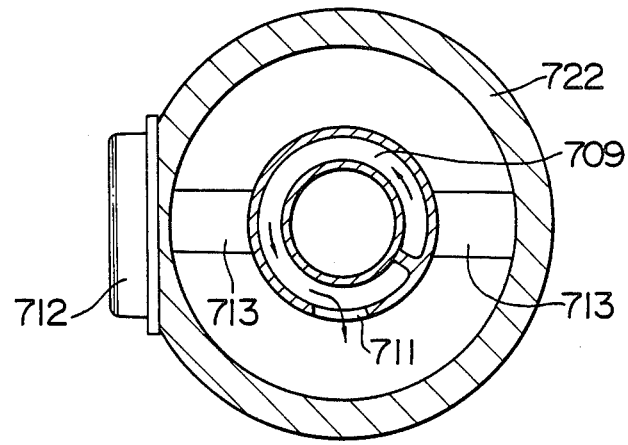
FIG. 30 is a sectional view taken along the line XXX—XXX in FIG. 29.

FIGS. 29 and 30 show a modification of the embodiment shown in FIGS. 27 and 28 in which a roundabout passageway 709 contiguous with a bypass passageway 703 is located along an outer periphery of the fuel-injection valve 720, to decrease the height of a wall portion 720 defining a throttle chamber. The arrangement of FIGS. 29, 30 offers the advantage that, besides being able to decrease the height of the throttle chamber, the outer diameter $D_2$ of the portion of the fuel-injection valve 720 whose outer peripheral defines the roundabout passageway 709 is greater than the outer diameter $D_1$ of the air flow rate measuring tube 710, thereby eliminating the need to provide the venturi 9 located in the main passageway shown in FIG. 27.

As described hereinabove, the air flow rate measuring tube 710 can be kept substantially at the same temperature as air flowing therethrough, even if the suction conduit 8 is heated. This enables the air flow rate measuring tube 710 to be formed of synthetic resinous material which has high formability. When the air flow rate measuring tube 710 is formed of synthetic resinous material, the provision of a sheath formed of conductive material to the periphery of probes 706 and 707 in the bypass passageway 703 can achieve the effect of reducing the noise level.

The reference numerals 711 and 713 designate an outlet and a stay, respectively. Parts shown in FIGS. 29 and 30 which are similar to those shown in FIGS. 27 and 28 are designated by like reference characters.

Figure 31:
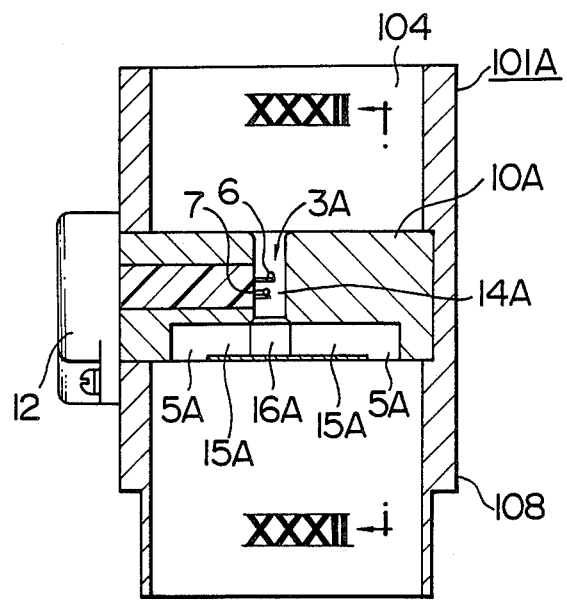
FIG. 31 is a vertical sectional view of a modification of the third embodiment shown in FIGS. 8-11.
Figure 32:
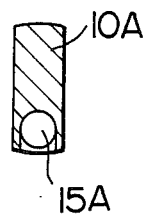
FIG. 32 is a sectional view taken along the line XXXII—XXXII in FIG. 31.
Figure 33:
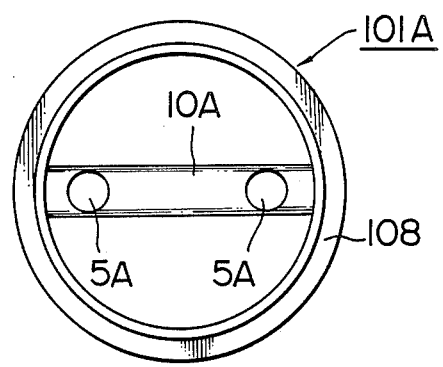
FIG. 33 is a bottom plan view of the modification of the embodiment shown in FIGS. 12-14.

FIGS. 31-33 show a modification of the embodiment shown in FIG. 7, wherein parts similar to those shown in FIG. 7 are designated by like reference characters. As shown, an air flow meter 101A comprises an air flow rate measuring tube 10A formed with a bypass passageway 3A comprising a longitudinal first passageway portion 14A located substantially in a central portion of a main passageway 104 and having a junction 2 serving as an air inlet of the bypass passageway 3A, and a radial second passageway portion 15A located substantially at right angles to the longitudinal first passageway portion 14A. The radial second passageway portion 15A has in the vicinity of either end thereof a confluence 5A, 5A serving as an air outlet of the bypass passageway 3A which faces down stream or lengthwise of the main passageway 104.

In the embodiment shown in FIG. 7, the confluence 5 serving as an outlet of the bypass passageway 3 has openings located at opposite sides of the air flow rate measuring tube 10 and each facing radially of the main passageway 104. Thus, the air flowed through the bypass passageway 3 and released through the confluence 5 into the main passageway 104 impinges substantially at right angle or obliquely to air flowing through the main passageway 104, thereby forcing the air flow in the main passageway 104 toward the central portion of the suction conduit 8. This means that the air flow released from the bypass passageway 3 into the main passageway 104 is an obstacle to the air flow through the main passageway 4, and reduces the flow area of the main passageway 4.

In the modification shown in FIGS. 31-33, air flowing into the bypass passageway 3A through the junction 2 first enters the longitudinal first passageway portion 14A where air flow velocity is measured by the hot wire probe 6 and temperature probe 7. The air flow is divided at a junction 16A into two air flows flowing in opposite directions through the radial second passageway portions 15A, 15A, before being released through the confluence 5A into the main passageway 104. The confluence 5A has openings which face downstream of the air flow through the main passageway 104, so that the air released into the main passageway 104 through the confluence 5A flow in currents parallel to the air flow through the main passageway 104, thereby offering no great resistance to the flow of air through the main passageway. This offers the advantage of minimizing the resistance offered to the flow of air through the main passageway.

What is claimed is:

1. An air flow meter in an internal combustion engine, the air flow meter comprising:
   a main passageway having an air inlet portion;
   an air flow rate measuring tube mounted in said main passageway and extending over a predetermined axial length thereof;
   a bypass passageway formed in the air flow rate measuring tube and including an air inlet portion located substantially in a central portion of a cross-sectional area of said main passageway and an outlet portion disposed downstream of the air inlet portion of said main passageway, said bypass passageway including at least one substantially straight portion having a constant cross-sectional area, and at least one further portion extending substantially at a right angle to said substantially straight portion, said bypass passageway having an axial length greater than said predetermined axial length of said air flow rate measuring tube;
   a hot wire type air flow sensor mounted in the at least one substantially straight portion of the bypass passageway;
   a control means including a control circuit means for controlling an operation of said hot wire type air flow sensor;
   wherein said hot wire type air flow sensor and said control means are formed as an integral unit forming a sensor assembly insertable in said air flow rate measuring tube, said sensor assembly in said air flow rate measuring tube and said air flow rate measuring tube form a unit insertable in said air inlet portion, and
   wherein the air flow rate measuring tube including the bypass passageway and the hot wire type air flow sensor is exposed to the main air flow so that a temperature of the air in the bypass passageway becomes substantially equal to a temperature of the air in the main passageway.

2. An air flow meter as claimed in claim 1, wherein said hot wire type air flow sensor comprises wound wire type probes.

3. An air flow meter as claimed in claim 1 or 2, wherein said air flow rate measuring tube is located transversely of said main passageway.

4. An air flow meter as claimed in claim 3, wherein said bypass passageway comprises a first passageway portion contiguous with said air inlet portion and extending lengthwise of said main passageway, and a second passageway portion located substantially at right angles to said first passageway portion and extending lengthwise of said air flow rate measuring tube, said second passageway portion being contiguous at opposite ends thereof with openings of said air outlet portion located at opposite sides of the air flow rate measuring tube.

5. An air flow meter as claimed in claim 1 or 2, wherein said air flow rate measuring tube is located lengthwise of said main passageway.

6. An air flow meter according to claim 1, wherein an outlet of the air flow measuring tube is substantially perpendicular to a flow direction of the main passageway.

7. An air flow meter according to claim 4, wherein at least for symmetrically disposed outlet means are provided in said second passageway for equalizing a difference in pressure.

* * * * *